United States Patent [19]

Butsch

[11] 4,133,015

[45] Jan. 2, 1979

[54] HEAD POSITIONER FOR DISC RECORDERS

[75] Inventor: Otto R. Butsch, Ann Arbor, Mich.

[73] Assignee: Sycor, Inc., Ann Arbor, Mich.

[21] Appl. No.: 778,137

[22] Filed: Mar. 16, 1977

[51] Int. Cl.² .......................... G11B 21/24; G11B 5/56
[52] U.S. Cl. .................................................... 360/109
[58] Field of Search ......................................... 360/109

[56] References Cited

U.S. PATENT DOCUMENTS

| | | | |
|---|---|---|---|
| 3,787,644 | 1/1974 | Schneider | 360/109 |
| 4,052,746 | 10/1977 | Weller | 360/109 |

*Primary Examiner*—Robert S. Tupper

*Attorney, Agent, or Firm*—Price, Heneveld, Huizenga & Cooper

[57] ABSTRACT

An adjustable head positioner for a disc recorder of the type including a translatable carriage for moving a magnetic head relative to a recording disc is disclosed. The adjustable head positioner includes an elongated mounting arm or extender secured to the carriage and defining adjacent one end a transverse guide. A head support member includes a glide slidably disposed within the mounting arm guide and a magnetic head of the data recorder is carried by the head support member. A manual adjustment member is carried by the mounting arm and operably engages the head support member for adjusting the position of the head support member relative to the cross arm along the guide.

5 Claims, 9 Drawing Figures

HEAD POSITIONER FOR DISC RECORDERS

BACKGROUND OF THE INVENTION

This invention relates to data recorder/reproducer devices of the type employing a limp, flexible, magnetic oxide coated disc.

Various forms of data recorder/reproducer devices have been proposed employing a "floppy" flexible disc media. The disc is coated with a magnetic oxide and placed in a sleeve-like protective envelope. The envelope is received within a holder having a slot formed therein at which is positioned a magnetic head. The magnetic head contacts the face of the disc as it is rotated and the head is translated radially along the disc by a lead screw driven carriage. In the assembly of such recorders, the head must be accurately positioned relative to the disc for proper operation. Should the head be misaligned so that the centerline of the recording head is displaced from the track centerline on the disc, errors will result.

Commonly owned U.S. Pat. No. 3,913,137 entitled TWIN FLEXIBLE DISC RECORDER WITH MOVABLE HEADS and issued on Oct. 14, 1975 to Samuel A. Morgan discloses a flexible disc recorder including a lead screw drive for a carriage which in turn supports a pair of recording heads on either side of a disc received in a disc holder. The carriage includes a follower nut threadably engaged by a lead screw and a transversely positioned cross arm. The cross arm carries an upstanding block at one end. The block is disposed generally in alignment with the disc receiver and a stiffly flexible head positioning arm is secured at one end to one side of the upstanding block. The flexible head positioning arm is secured to a thin metal or platelike member which in turn is attached by a plurality of screws to the upstanding block of the cross arm. The opposite end of the head positioning arm is attached to a laterally-extending tab portion of a head carrier. The magnetic head is supported by the head carrier adjacent the slot formed in the disc receiver or holder of the device.

In order to properly align the head relative to the disc, the length of the stiffly flexible head positioning arm, which is typically of a stainless steel music wire material, must be varied or the position of the thin metal plate secured by a plurality of screws relative to the upstanding block must be varied. This alignment procedure has been found to be extremely time consuming involving repeated tries to accurately align the head. This alignment procedure, therefore, complicates the assembly of the device at the factory and also provides a source of frustration for the ultimate user of the disc recorder in the field. Should the head be out of alignment with respect to the centerline of a track on the disc, errors result in the operation of the device.

Therefore, a need exists for an improved means for supporting the magnetic head of the recorder relative to the disc whereby head alignment may be more easily obtained without the time consuming procedures heretofore employed.

SUMMARY OF THE INVENTION

In accordance with the present invention, an improved head positioner for a disc recorder is provided whereby the problems heretofore experienced in the assembly and alignment adjustment of the head are substantially eliminated. Essentially, the head positioner includes a head support member or mount to which a head carrier support arm is attached and which includes a glide extending along one edge. The glide is configured to be received within a guide or track formed adjacent one end of a carriage extender adapted to be secured to the carriage or follower of the recorder. A manual adjustment means is carried by the carriage extender and operably engages the head support member. The manual adjustment means permits ready adjusting of the position of the head support member relative to the extender along the guide or track.

In narrower aspects of the invention, the manual adjustment means comprises a single adjustment screw readily rotated through the use of a screwdriver or the like to adjust the positioning of the support member relative to the carriage extender guide. Further, a clamping means may be provided for positively clamping the head support member to the extender after completion of head alignment procedures.

DETAILED DESCRIPTION OF THE PREFERRED EMBODIMENT

Figures 1, 4:
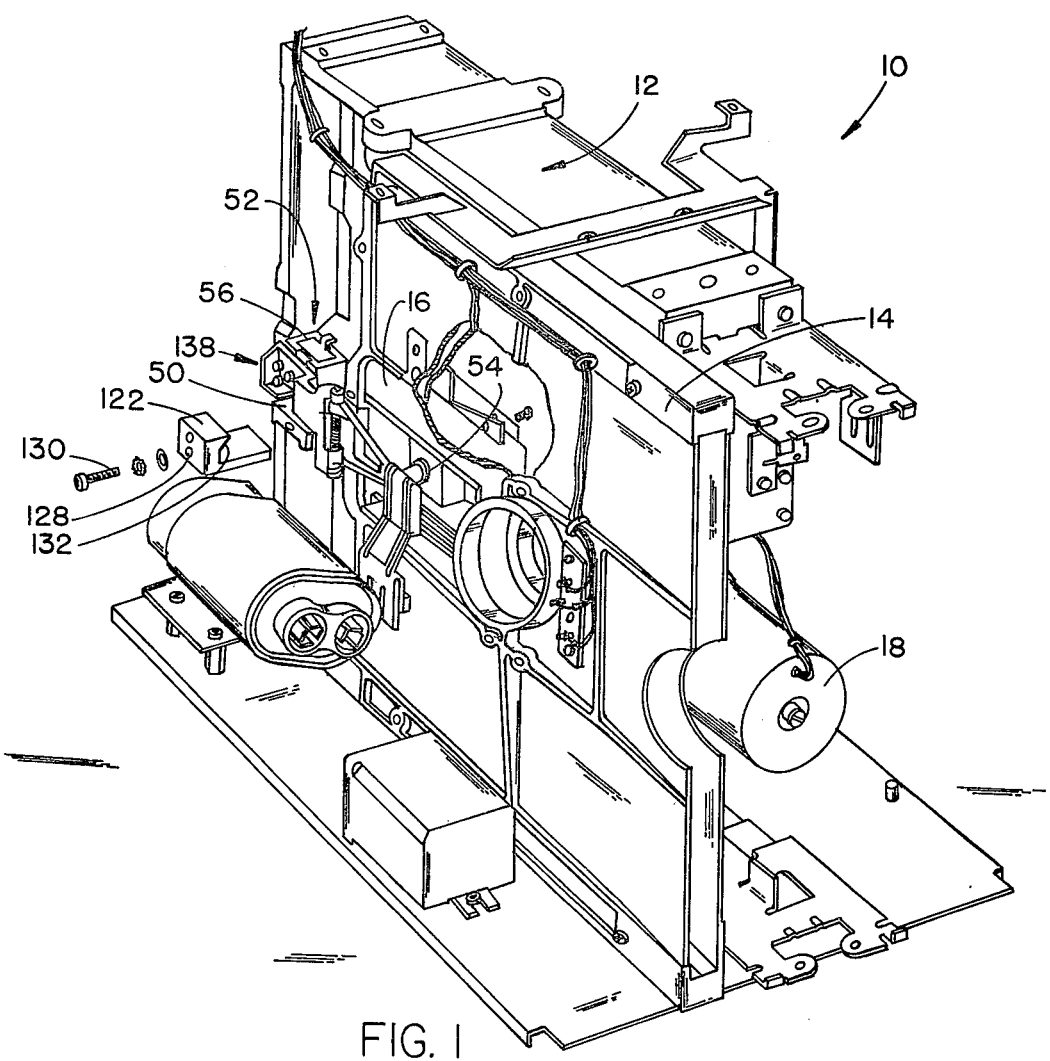
FIG. 1 is a fragmentary, partially exploded, perspective view of a portion of a disc recorder incorporating the unique head positioner in accordance with the present invention.
FIG. 4 is a fragmentary, front elevational view of a carriage supporting a carriage extender included in the present invention.

A portion of a data recorder device of the type employing "floppy" flexible disc media and incorporating the unique head positioner or head locater in accordance with the present invention is illustrated in FIG. 1 and generally designated 10. As shown therein, the recorder includes a generally rectangular, four-sided frame member 12 to which are attached the various components of the recorder. The recorder illustrated in FIG. 1 includes at least one disc receiver or holder 14 pivotally secured to the frame 12. The disc holder or receiver 14 includes a slot 16 extending therethrough. The slot 16 is positioned so as to expose the recording disc opening through a slot in a protective envelope. A more detailed description of the type of disc recording media and of a disc recorder per se may be found in U.S.

Pat. Nos. 3,668,658; 3,678,481 and the aforementioned 3,913,137.

Figure 2:
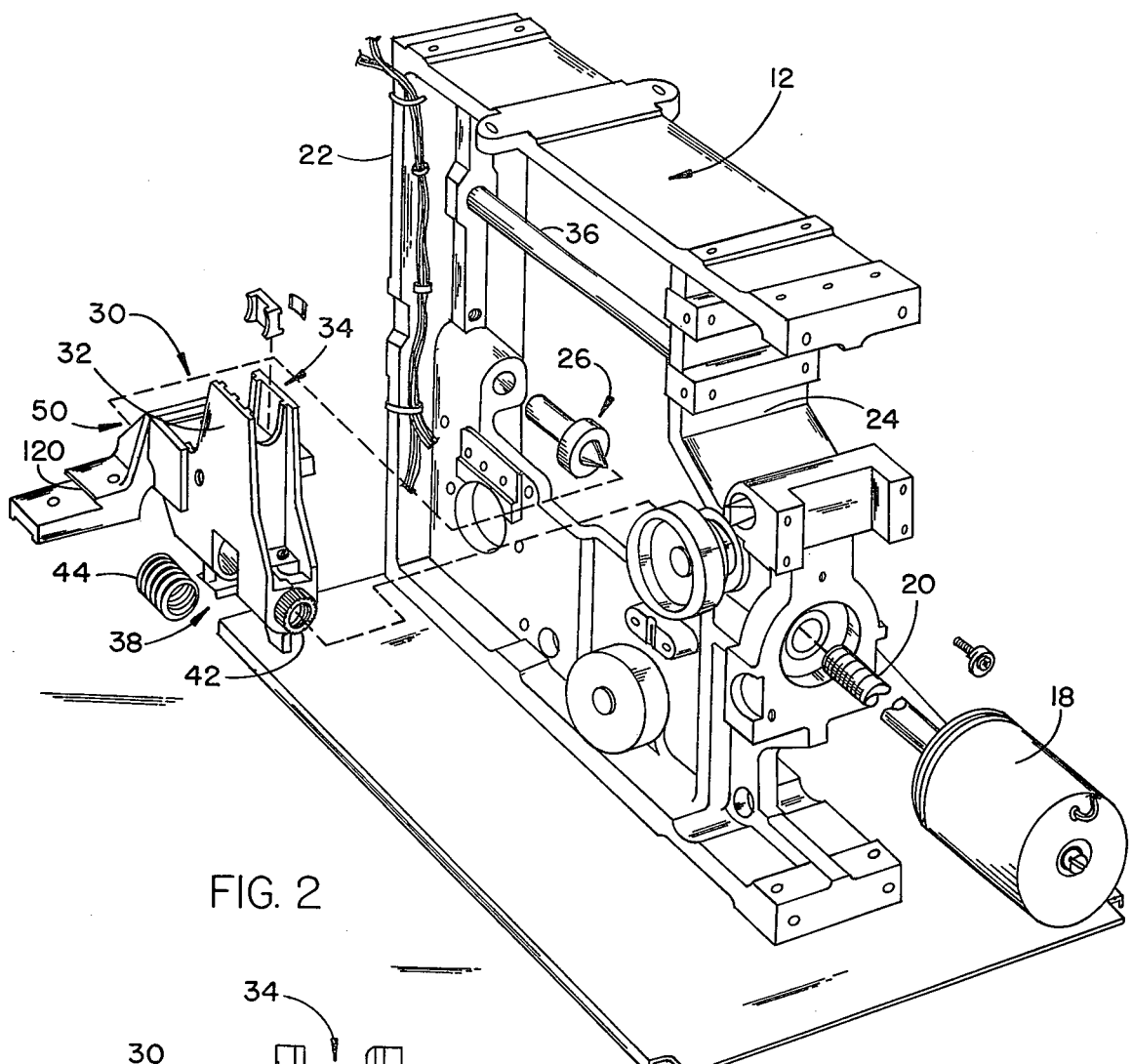
FIG. 2 is a fragmentary, partially exploded, portion of the disc recorder of FIG. 1 illustrating a lead screw drive, carriage follower and the carriage extender of the present invention.

The disc recorder includes a stepper motor 18 for rotating a lead screw or worm 20 in a step-like fashion (FIG. 2). The lead screw 20 extends between side members 22, 24 of the frame 12 and is supported at one end by a spring loaded, live center 26. A more detailed description of the stepper motor, lead screw drive including the live center 26 may be found in Applicant's commonly owned, copending application, Ser. No. 778,144, entitled DISC RECORDER DRIVE and filed on even date herewith. Other forms of lead screw drives may be employed with the head positioner in accordance with the present invention. For example, the "captured" lead screw illustrated in U.S. Pat. No. 3,913,137 may be employed.

As is seen in FIGS. 2 and 4, the lead screw 20 threadably engages a carriage or follower assembly 30. The follower assembly includes a molded plastic body member 32 defining a generally U-shaped glide portion 34 adapted to be received or ride on a guide rod 36. The guide rod 36 extends between the frame members 22, 24 in spaced, parallel relationship with the lead screw or worm 20. The carriage or follower assembly 30 further includes a longitudinally extending bore 38 including a first portion within which is disposed a follower 40 and a second portion within which is disposed an adjustment member 42. The follower 40 and the adjustment member 42 are internally threaded and ride on the lead screw 20. A coil spring 44 is positioned between the follower nut 40 and the adjustment member 42 to compensate for backlash on the lead screw to thereby insure a snug fit of the follower with respect to the lead screw. A more detailed description of the carriage assembly per se may be found in Applicant's copending application, Ser. No. 778,143, now U.S. Pat. No. 4,071,866, issued Jan. 31, 1978, entitled DISC RECORDER DRIVE FOLLOWER ASSEMBLY, and filed on even date herewith.

Figure 8:
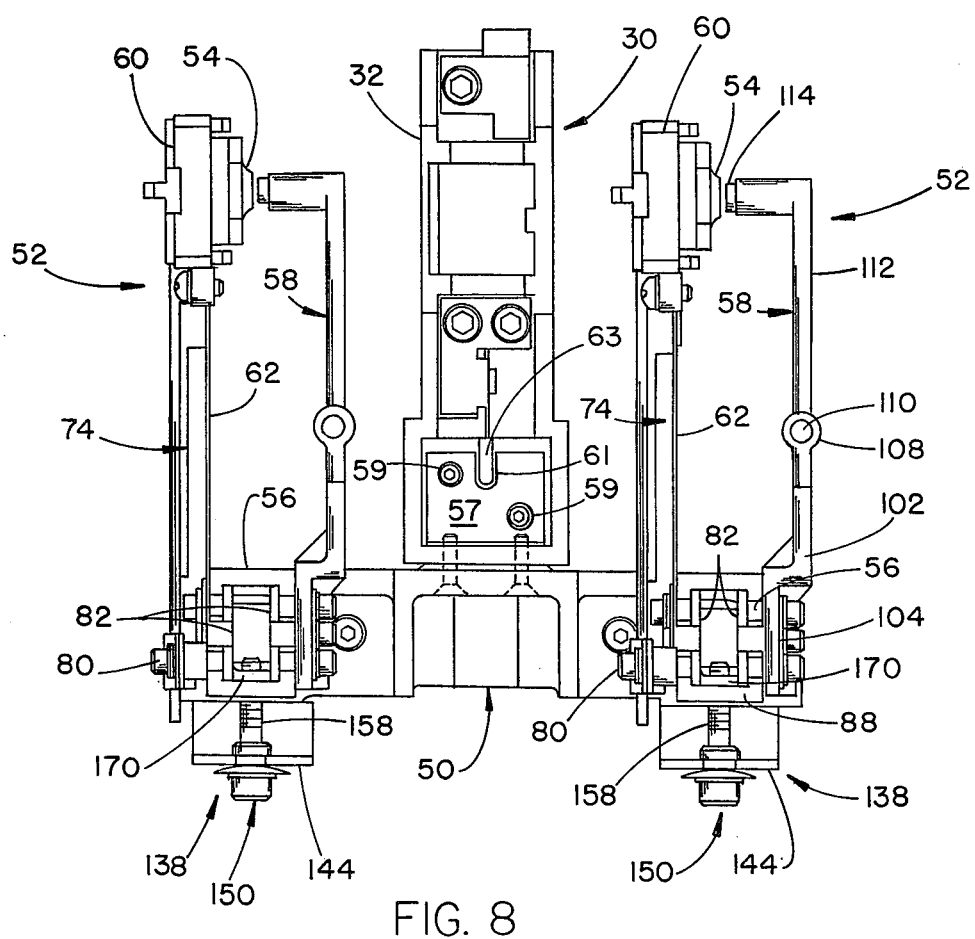
FIG. 8 is a top, plan view of a carriage or follower including the head assemblies mounted in accordance with the present invention.

Secured to the body 32 of the carriage follower 30 is a transversely extending cross arm 50 or carriage extender. The extender 50 is preferably cast from an aluminum alloy and machined to within the specified tolerances. The casting process results in more accurate production than with the molded extenders heretofore employed. The presently preferred material is an aluminum alloy sold under the trademark Precedent 71A-75. The extender 50 extends generally perpendicular to the body portion 32 of the follower outwardly to a point generally in line with the disc receiver or holder 14 (FIGS. 1 and 4). The extender includes a mounting flange 57 which extends into a cavity molded as part of the body 32. The flange is secured to the body by fasteners 59. The flange includes a slot 61 within which extends a tab 63 molded integral with the body 32. This results in a rigid, fixed mount for the extender. Although only a single disc receiver or holder 14 has been illustrated in FIG. 1 for simplicity's sake, it should be understood that the typical disc recorder will include a pair of such holders, one positioned on each side of the frame. As seen in FIGS. 1 and 8, the cross arm 50 supports a head assembly 52. The head assembly 52 includes a magnetic head 54 supported on a head support member or mount 56 and a hinged, back-up pad assembly 58.

Figure 5:
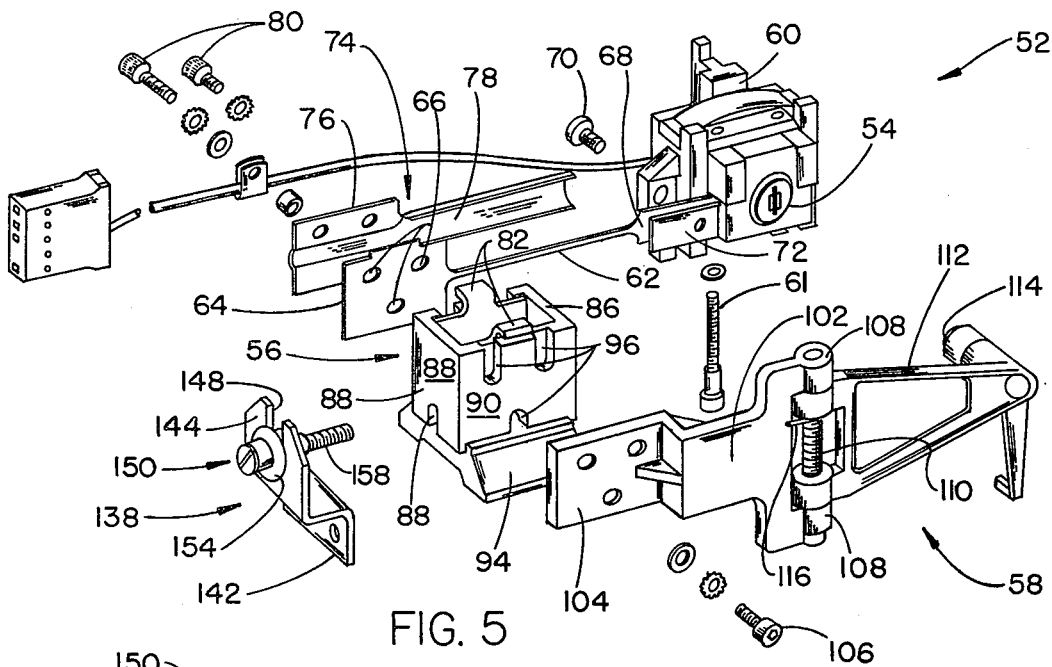
FIG. 5 is an exploded view of the head assembly including the head positioner in accordance with the present invention.

As best seen in FIGS. 5 and 8, the head mount or support member 56 supports the head 54 within a head carrier 60. The carrier 60 which is preferably a molded plastic member, has the head 54 secured by suitable fasteners 61, only one of which is shown. A flexible stiff, metal arm 62 supports the carrier 60 from the head mount member 56. The arm 62 which is preferably fabricated from a material having the resiliency of music wire or metal leaf spring material, includes a mounting tab or planar portion 64 having apertures 66 formed therein. The opposite end of the arm 62 has another tab or planar portion 68 to which the carrier 60 is attached by means of a suitable fastener 70 extending through the carrier 60 and through a plate-like nut 72. A guard 74 including a planar portion 76 and an elongated arm-like portion 78 is also provided. The guard 74 and the support arm 62 are secured to the block 56 by suitable fasteners 80 which extend through the guard 74, the support arm tab portion 64 and a wall of the block member 56. A nut plate 82 is disposed within the block 56 to retain the fasteners.

Figure 7:
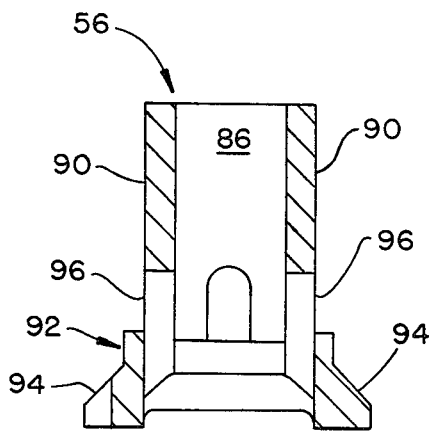
FIG. 7 is a cross-sectional, elevational view of the head support member in accordance with the present invention.

As seen in FIGS. 5 and 7, the support or head mount member 56 is a hollow member having a generally rectangular configuration in section including front and rear walls 86, 88 respectively and sidewalls 90 defining an upstanding hollow, main body portion. The base 92 of the support block is defined by a pair of outwardly extending flanges 94. The flanges 94 are of a generally dovetail configuration and serve as glides. The sidewalls 90 are provided with suitable apertures or slots 96 through which the fasteners 80 for the head support arm may pass.

The back-up pressure pad assembly 58, as seen in FIGS. 4 and 5, includes a hinge plate member 102 including a mounting portion 104 having suitable apertures formed therein through which fasteners 106 may pass to secure the hinge member to the support block 56 at the slots 96. The fasteners extend through a nut plate 82 positioned within the mount 56. The hinge plate 102 defines a pair of vertically spaced knuckles 108 through which a hinge pin 110 extends. Supported on the hinge pin 110 is an arm 112. At the end of the arm directly opposite the head 54 is positioned a pressure pad 114. A coil spring 116 surrounding the hinge pin 110 and engaging the hinge plate 102 and the arm 112 is provided to bias the pressure pad 114 against the head 154. The back-up pressure pad 114 is provided to insure that the disc is maintained in contact with the head during operation of the data recorder device. This is a conventional feature as is discussed in the aforementioned U.S. Pat. No. 3,913,137. In the alternative, the back-up pressure pad assembly 58 may be dispensed with and a second recording head 54 may be carried by the block 56 to permit recording/reproducing from both sides of the disc media. This is also more fully disclosed in U.S. Pat. No. 3,913,137.

Figure 3:
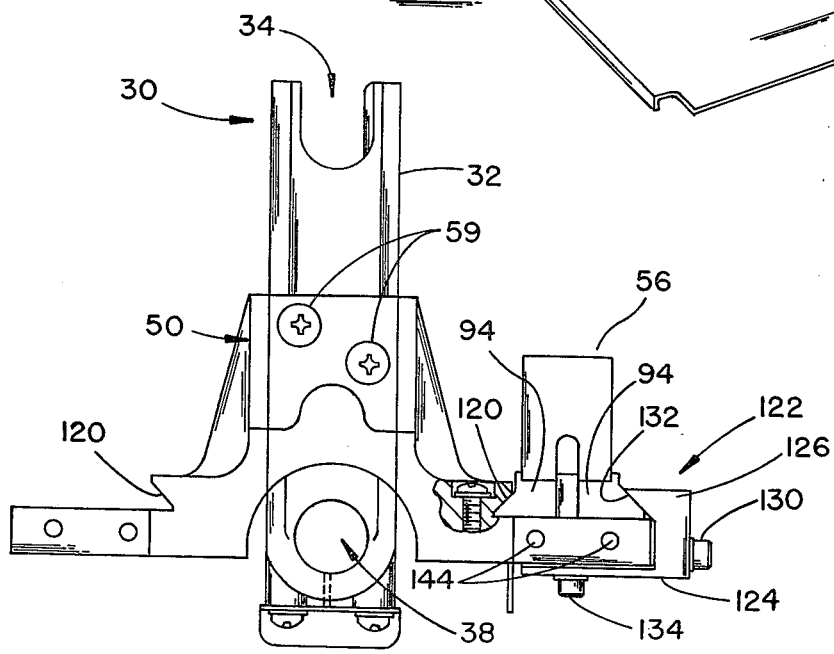
FIG. 3 is an end, elevational view of the carriage or lead screw follower including the extender and head support member in accordance with the present invention.
Figure 9:
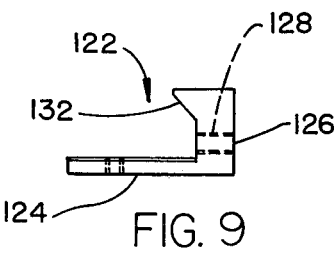
FIG. 9 is a side, elevational view of a clamp member incorporated in the head positioner of the present invention.

As seen in FIGS. 2 and 3, the cross arm or extender 50 defines dovetail shaped guides or tracks 120 which extend transversely of the cross arm 50 adjacent each end thereof. The dovetail guide or track 120 is dimensioned to receive in a sliding fashion the dovetail flange or glide 94 formed as part of the support or head mount member 56 (FIG. 3). A dovetail clamp member 122 as seen in FIGS. 3 and 9 clamps the head mount 56 to the cross arm 50. The dovetail clamp 122 has a generally L-shape and includes a first portion 124 and a second, generally vertically upstanding portion 126. The second portion 126 includes a suitable aperture 128 through which a fastener 130 extends. Portion 126 also defines a dovetail guide or track 132. As seen in FIG. 3, the clamp 122 is secured to the end of the cross arm 50 by fasteners 130, 134 and clamps the mount 56 in position on extender 50.

It should now be apparent, that the mount 56 may be slidably positioned along the cross arm within the dovetail guides or tracks 120 and 132 defined by the cross arm and the clamp 122, respectively. By shifting the support member relative to the extender 50, the positioning of the head 54 may be varied in order to align the head relative to the centerline of the tracks on the disc. An adjustment means 138 is provided for manually adjusting the position of the support member 56 relative to the cross arm.

As seen in FIGS. 1, 5, and 8, the adjustment means 138 includes an adjusting screw bracket 140 secured to the cross arm 50 in line with the rear wall 88 of the head mount 56. The bracket 140 includes an attachment portion 142 through which suitable fasteners extend to secure the bracket at apertures 144 in the extender 50 (FIG. 3). The bracket 140 also includes an upstanding, vertical portion 144 joined to the mounting portion 142 by a generally horizontal portion 146. The vertical portion 144 defines an upwardly opening slot 148 (FIG. 5). An adjusting screw 150 is held relative to the bracket 140 at the slot 148.

Figure 6:
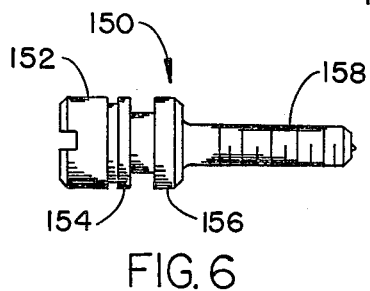
FIG. 6 is a side, elevational view of the adjustment screw of the present invention.

As seen in FIG. 6, the adjusting screw 150 is a generally elongated, threaded rod including a slotted head 152 and a pair of circular, longitudinally spaced, radially extending flanges 154, 156. The spacing between the flanges 154 and 156 is approximately equal to the thickness of the vertical portion 144 of the bracket 140. Therefore, as seen in FIGS. 5 and 8, the adjusting screw 150 may be rotated when in position on the bracket 140 yet its axial position with respect to the bracket is fixed. As seen in FIG. 8, the threaded portion 158 of the fastener 150 extends through an aperture 168 formed in the rear wall 88 of the support 56. Positioned within the confines of the head mount member 56 is another nut plate 170. The nut plate 170 includes a threaded aperture aligned with aperture 168 and threadably engages the threaded portion of adjusting screw 150. Therefore, as should now be readily apparent, rotation of the adjustment screw 150 will result in translating movement or shifting of the head support or mount member 56 within the guides or tracks defined by the extender 50 and the clamping member 122.

Once the head assembly has been positioned on the extender by sliding the mount 56 within the guides 120, 132, the head alignment may be checked. In determining if the centerline of the recording head is displaced from a track centerline on the disc media, a specially prerecorded alignment disc is placed in the device. The tracks on the disc are prewritten so that the voltage output of the recording head may be employed to determine the lateral displacement of the read/write gap bisecting line of the head with respect to the track's centerline. An oscilloscope may then be employed to determine the voltage output of the head and the adjustment screw 150 may be manually rotated through the use of a suitable tool, such as a screwdriver, until the predetermined head output voltage is indicated on the oscilloscope. Once the head is positioned in proper alignment relative to the calibration disc, the clamp 122 may then be tightened to insure that the head support or mount member 56 will not shift within its guides or trackways during operation of the device.

The unique head positioner in accordance with the present invention substantially alleviates the problems heretofore experienced in the trial and error approach to head alignment. The technician need merely turn a single screw to properly position the head. The adjustment screw positively holds the support head relative to the extender and therefore the need for readjustment upon tightening of the clamp member is minimized. The time required to assemble a disc recorder and properly align the heads is substantially reduced from that theretofore possible. Also, the maintenance of the disc recorder in the field relative to proper head alignment is made substantially easier. Therefore, Applicant's unique invention represents a substantial advancement in the manufacture, assembly and adjustment of disc recorders of the type employing a lead screw drive and a carriage follower for supporting one or more magnetic heads relative to a floppy disc.

The above description should be considered, however, as that of the preferred embodiment only. The true spirit and scope of the present invention may be determined by reference to the appended claims.

The embodiments of the invention in which an exclusive property or privilege is claimed are defined as follows.

1. In a data recorder/reproducer device of the type including a lead screw drive element, a follower carriage operatively engaged by the lead screw drive element and a disc holder for receiving a flexible disc, and improved, adjustable head positioner comprising:
   a carriage extender securable as a cross-member to said carriage and extending laterally outwardly therefrom, said extender defining a guide track spaced from but extending alongside of the longitudinal axis of said drive element;
   a head mount member including a first glide disposed for sliding movement only within said guide track, said first glide having a configuration conforming to the configuration of said guide;
   a recorder/reproducer head secured to said head mount member and positioned at the side of said disc holder;
   manually adjustable means carried by said extender and threadably engaging said head mount member for adjusting the position of said glide upon, said guide track by moving said glide along the guide track, said head mount member further including a second glide extending generally parallel to said first glide; and
   a clamp member mounted on said carriage extender and releasably clamping said second glide to thereby clamp said head mount member on said extender.

2. The improvement defined by claim 1 wherein said manually adjustable means comprises:
   a mounting bracket having a generally, vertical, planar portion defining a slot therein, said bracket being secured to said extender; and
   a threaded adjustment member disposed within said slot and threadably engaging said head mount member whereby rotation of said adjustment member shifts said head mount member relative to said slot.

3. An adjustable positioner for the transducing head of a data recorder/reproducer device of the type including a carriage which is translatable along a linear axis for translating a head along the side of a recording disc, said adjustable positioner comprising:
   an elongated, mounting arm projecting laterally from said carriage, said mounting arm defining adjacent one end a transverse guide extending generally parallel to the axis of carriage movement;

a head support member having a glide extending along one edge, said glide slidably disposed within said mounting arm guide, said guide having a configuration conforming to said guide, said head support member having the head of the data recorder/reproducer device supported thereby;

manual adjustment means carried by said mounting arm and operatively and positively engaging said head support member for moving the head support member along said guide to adjust the position of the head support member relative to the mounting arm; and clamping means carried by said mounting arm for positively clamping said head support member to said mounting arm in different positions of adjusted movement along said guide.

4. An adjustable positioner for the head of a data recorder/reproducer device of the type including a translatable carriage for translating a head relative to a recording disc, said adjustable positioner comprising:

an elongated mounting arm adapted to be secured to said carriage, said mounting arm defining adjacent one end a transverse guide;

a head support member having a glide extending along one edge, said glide slidably disposed within said mounting arm guide, said head support member having the head of the data recorder/reproducer device supported thereby;

manual adjustment means carried by said mounting arm and operatively engaging said head support member for adjusting the position of the head support member relative to the mounting arm along said guide;

clamping means carried by said mounting arm for clamping said head support member to said mounting arm; said head support member including:

a base, said base defining said glide, said guide being of a generally dovetail configuration, and said glide being of a mating configuration;

an upstanding, hollow main body portion having at least one sidewall generally perpendicular to said glide, said one sidewall defining an aperture therethrough; and a plate having a threaded aperture positioned within said body portion, said threaded aperture aligned with said sidewall aperture.

5. An adjustable positioner as defined by claim 4 wherein said manual adjustment means comprises:

a bracket having a generally vertical portion defining an upwardly opening slot, said bracket being carried by said mounting arm; and an elongated rod having a threaded portion and a pair of spaced flanges extending radially therefrom, said flanges being spaced approximately the thickness of said bracket first portion, said rod being disposed within said slot so that said flanges are on each side of said bracket fixing the position of said rod relative to said bracket, said threaded portion of said rod extending through said sidewall aperture of said main body portion and threadably engaging said plate threaded aperture.

* * * * *

UNITED STATES PATENT AND TRADEMARK OFFICE
CERTIFICATE OF CORRECTION

PATENT NO. : 4,133,015
DATED : January 2, 1979
INVENTOR(S) : Otto R. Butsch

It is certified that error appears in the above—identified patent and that said Letters Patent are hereby corrected as shown below:

Column 6, line 26:

"and" (second occurrence) should be --- an ---;

Column 7, line 3:

"guide" (second occurrence) should be --- glide ---.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks